Nov. 18, 1969     E. J. DOWER     3,479,001
CLOSURE MEMBER AND APPARATUS FOR CONTROLLING
FLUID FLOW THROUGH A CONDUIT
Filed July 3, 1967     5 Sheets-Sheet 1
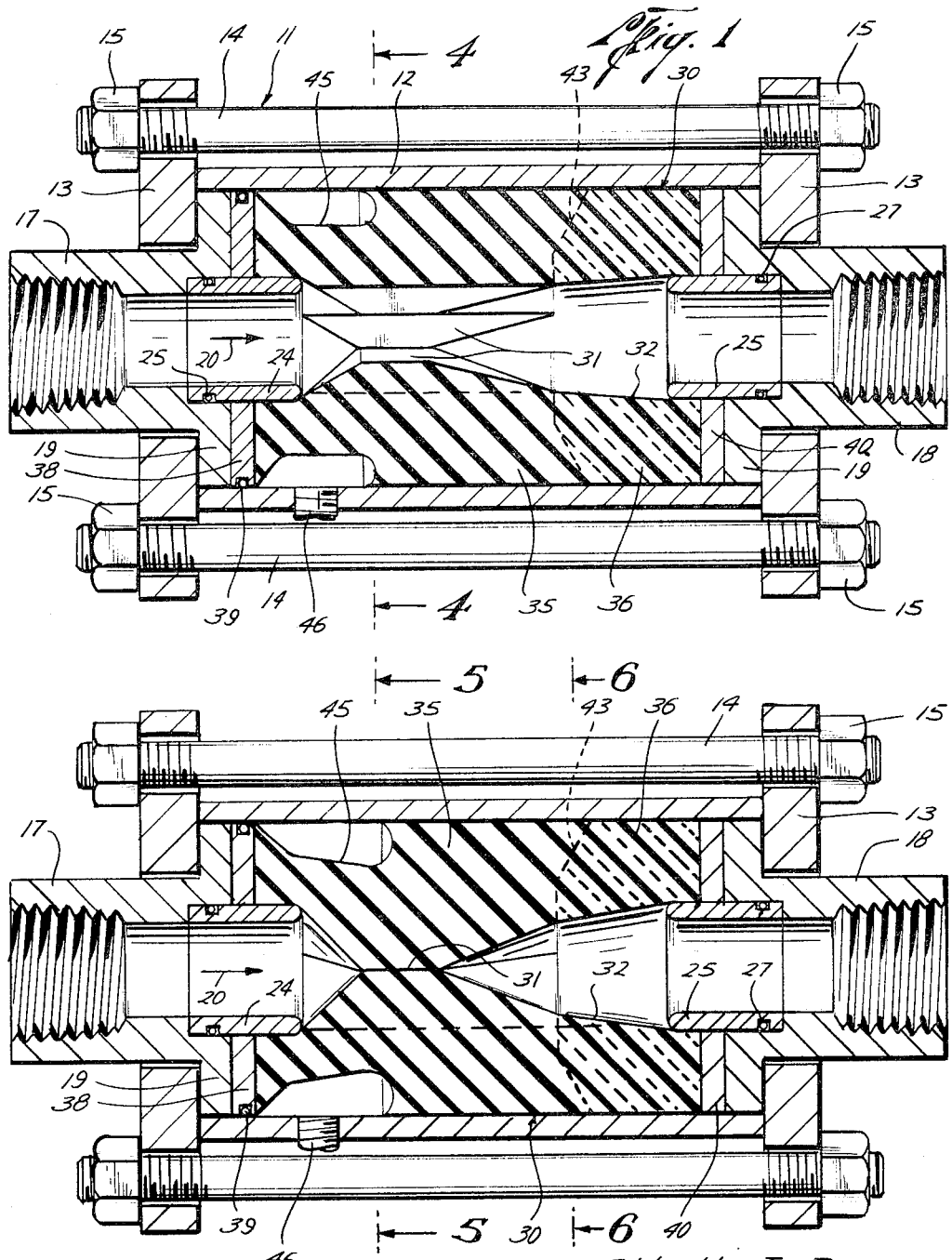
Ethell J. Dower
INVENTOR
BY Paul E. Harris and
Lee R. Larkin
ATTORNEYS Nov. 18, 1969  E. J. DOWER  3,479,001
CLOSURE MEMBER AND APPARATUS FOR CONTROLLING
FLUID FLOW THROUGH A CONDUIT
Filed July 3, 1967  5 Sheets-Sheet 2
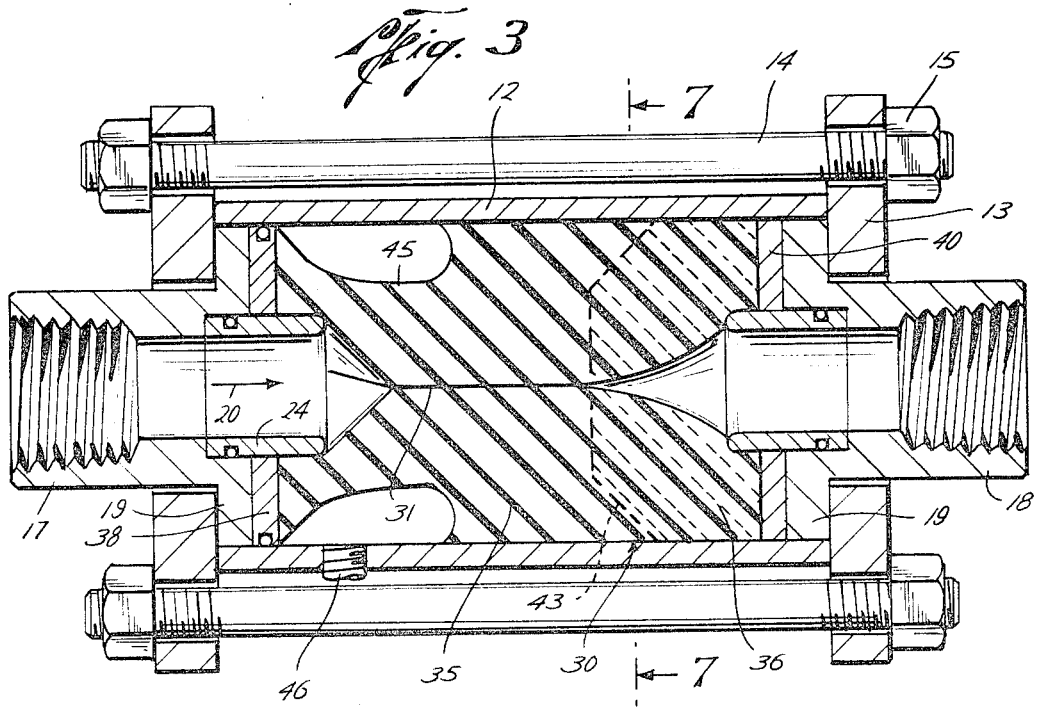
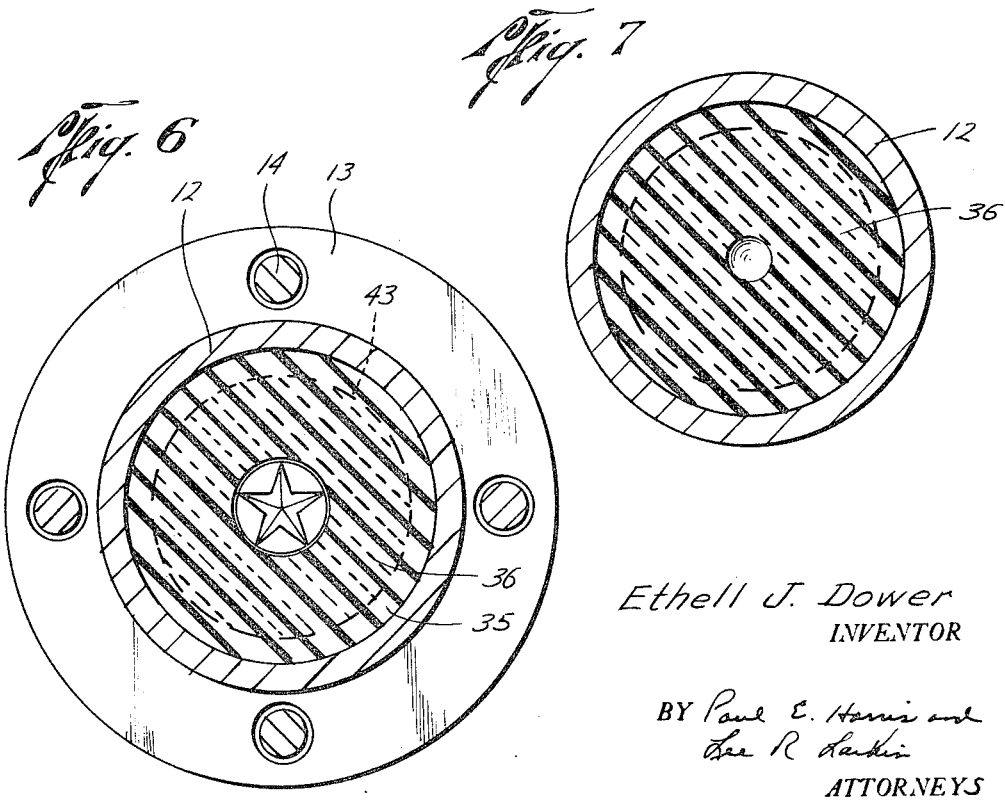
Ethell J. Dower
INVENTOR
BY Paul E. Harris and
Lee R. Larkin
ATTORNEYS

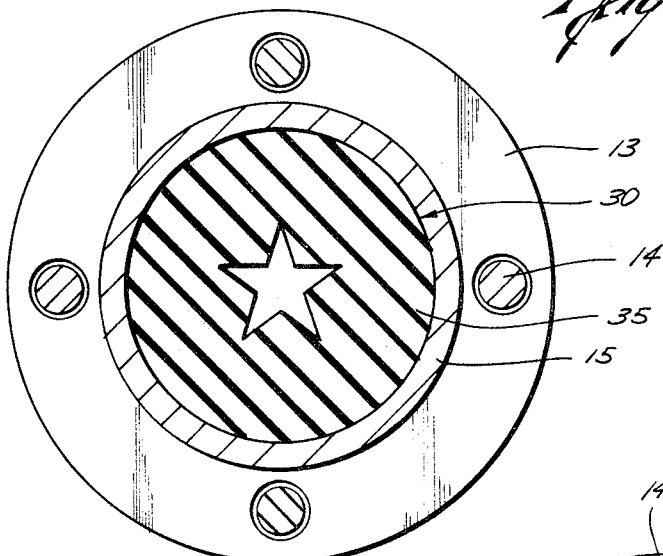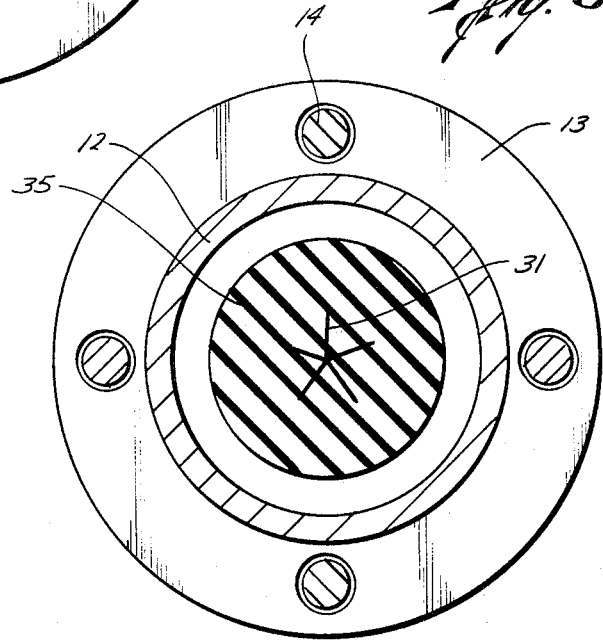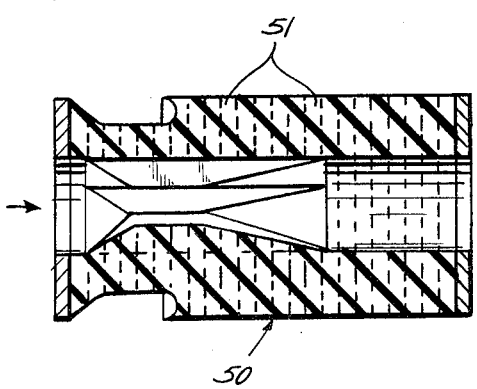

Nov. 18, 1969     E. J. DOWER     3,479,001
CLOSURE MEMBER AND APPARATUS FOR CONTROLLING
FLUID FLOW THROUGH A CONDUIT
Filed July 3, 1967     5 Sheets-Sheet 4
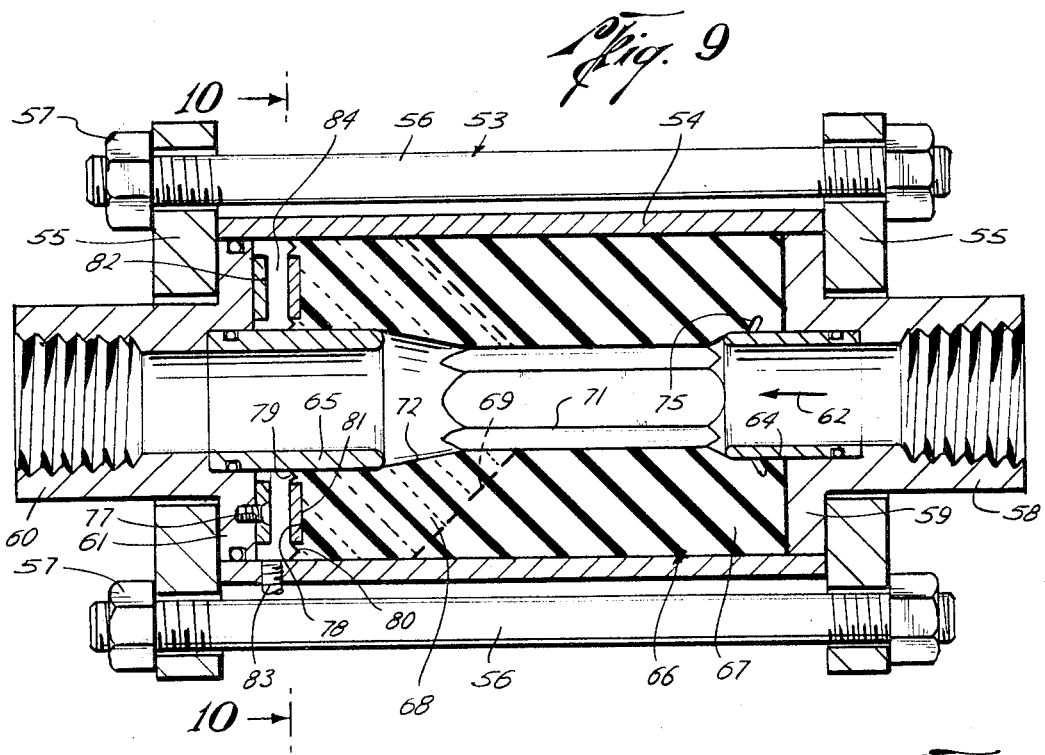
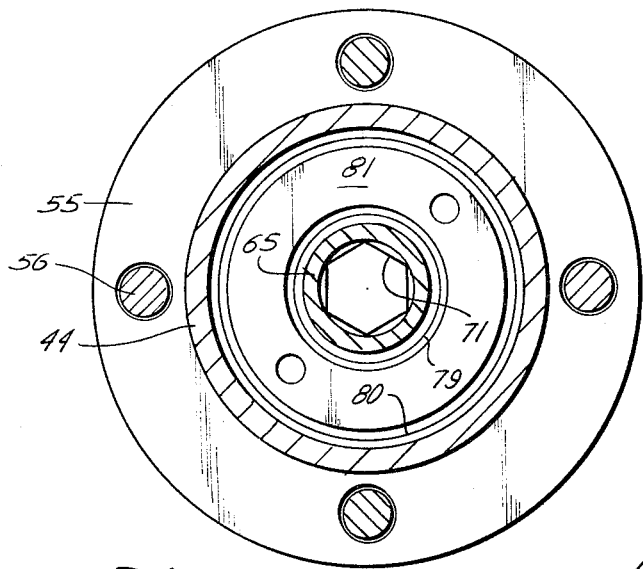
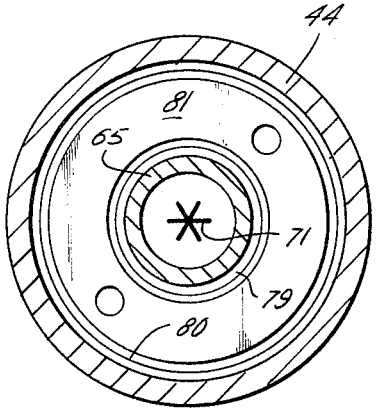
Ethell J. Dower
INVENTOR
BY Paul E. Harris and
Lee K. Larkin
ATTORNEYS Nov. 18, 1969     E. J. DOWER     3,479,001
CLOSURE MEMBER AND APPARATUS FOR CONTROLLING
FLUID FLOW THROUGH A CONDUIT
Filed July 3, 1967     5 Sheets-Sheet
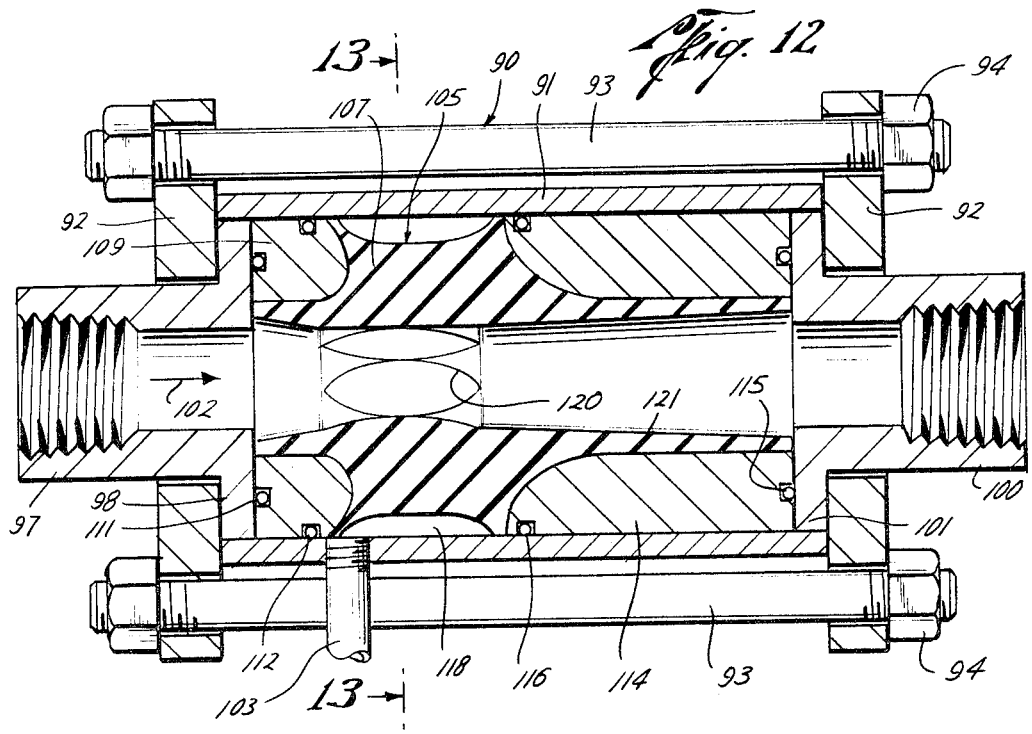
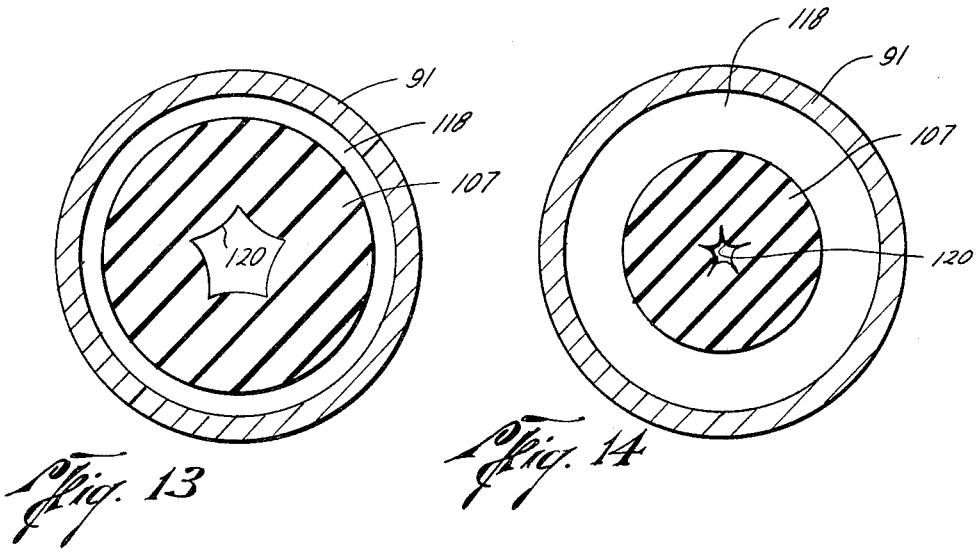
Ethell J. Dower
INVENTOR.
BY Paul E. Harris and
Lee R. Larkin
ATTORNEYS

# United States Patent Office 3,479,001
Patented Nov. 18, 1969

3,479,001
CLOSURE MEMBER AND APPARATUS FOR CONTROLLING FLUID FLOW THROUGH A CONDUIT
Ethell J. Dower, Houston, Tex., assignor to Warren Automatic Tool Company, Houston, Tex., a corporation of Texas
Filed July 3, 1967, Ser. No. 650,854
Int. Cl. F16l *55/14;* F16k *51/00, 15/14*
U.S. Cl. 251—4                                           4 Claims

ABSTRACT OF THE DISCLOSURE

A closure member and apparatus for controlling fluid flow through a conduit. The apparatus includes an elastic body defining a passageway for fluid flow and means for deforming the body to selectively enlarge and restrict the passageway. The body member is arranged to be easily deformed in one area and to resist deformation in another area. It is particularly useful in controlling fluid flow through the mud return line of an oil well drilling rig, for example.

---

This invention relates to a closure member and apparatus for controlling fluid flow through a conduit. More particularly, it relates to an elastic body or closure member which is adapted for mounting in a housing connected in a fluid conduit for passage of fluid flow therethrough, and to exert a back pressure on the fluid passing therethrough, or selectively shut off fluid flow entirely, for example. The closure member has a particularly shaped and configured bore therethrough including a cross sectional area which is adapted to be readily collapsed radially inwardly to thereby restrict fluid flow through the bore. The invention herein has particular utility for mounting in the mud return line of a drilling rig, for selectively applying back pressure to the drilling mud being returned from the well bore, for example, but still permitting fluid flow therethrough.

There are a number of problems associated with controlling fluid flow through a conduit by means of an elastomeric closure member. The closure member must be sufficiently strong to contain the desired pressure drop through the conduit and it must also withstand high velocity for long periods of time without failing. It is also desirable to have a closure member which will have the best possible venturi type discharge opening when partially closed to thereby avoid cavitation of the fluid therealong, since cavitation tends to cause excessive wear. It also is desirable to have a closure member which can be moved to the closed position with the smallest possible pressure thereagainst in excess of drilling fluid pressure. The smaller this pressure differential is, the more the closure member acts as a diaphragm to thereby give better control on the amount of back pressure applied to the drilling fluid. While a relatively soft elastomeric material will accomplish easy closing, it is, of course, subject to greater wear because of its softness and will not hold as high a back pressure without failure.

It is also desirable to have a closure member which is not subject to mechanical binding or cocking which would thereby increase the amount of pressure differential required to effect the desired closing. It is also important to have the closure member arranged such that it will be subjected to a minimum of stress in moving to the closed position in order to avoid breakage of the rubber.

There are a number of prior art apparatuses which are designed to control the fluid flow through a conduit in response to an oil pressure, for example, applied thereto, but none of these provide a full solution to the foregoing problems.

One example of a prior art apparatus is shown and described in the magazine entitled, The Oil and Gas Journal, Oct. 18, 1965, pages 7, 52, and 53. Another device is shown and described in the same magazine in the issue dated Aug. 9, 1965, at pages 8, 94, and 95.

However, all of the prior art devices utilize a generally round or circular bore. The problem with a round or circular bore is that when a pressure is applied to the closure member having the bore, the bore is deformed to a smaller and smaller circle, which requires that a great deal of stress be put upon the closure member in order to effect closing. Finally, a round bore tends to collapse flat when it reaches a high degree of stress. When collapsed in a flat closure, it has a poor venturi effect with greater cavitation of the drilling fluid as the fluid leaves the closure member, thereby causing greater wear and causing the closure member to be pulled away from the housing which causes oil leaks in some instances. Further, because of the extremely high amount of oil pressure over mud line pressure required to close such a closure member, the closure member is less responsive to changes in back pressure applied to the drilling mud. Moreover, this increased pressure causes more rapid wear of the closure member than is desirable.

A closure member which is made of a soft elastomeric material will close with less pressure differential over line pressure or mud pressure, but it is subject to greater wear because of its softness and it will also have a poor venturi outlet because of the deformation in the outlet area. With harder elastomeric material, the greater pressure differential required to move the closure member to the closed position results in quicker breakdown of the closure member.

It is therefore an object of this invention to provide an improved closure member and apparatus for controlling fluid flow through a conduit, which closure member and apparatus provides a solution to the foregoing problems.

Briefly stated, one embodiment of the apparatus invention herein is for controlling fluid flow through a conduit, comprising an elastic body defining a passageway for fluid flow and means for deforming the elastic body to selectively enlarge and restrict the passageway. The improvement includes a plurality of internal fold lines in at least a first portion of the body arranged to define a non-circular cross-section through the first section and to facilitate radial deformation of said body at said first portion. The body also has a second portion arranged to resist radial deformation.

Briefly stated, one embodiment of the closure member of this invention has an axial passageway therethrough and is adapted for mounting in and controlling fluid flow through a housing having inlet and outlet means communicating with said passageway. The housing includes means for deforming the closure member to selectively enlarge and restrict the passageway. The closure member has a generally non-circular internal surface along a first portion of the passageway. The closure member also has a generally circular internal surface along a second portion of the passageway. The closure member is, at least in part, of an elastomeric material which is arranged for less radial deformation in said second portion than in said first portion.

For purpose of this application, the terms "polygonal" and "polygon" refer to a geometric configuration having at least three sides and preferably five or more.

For purposes of this application, the term "star shaped" is used to refer to a figure having at least three points.

Further, the terms "outlet end" and "discharge end" may sometimes be used interchangeably herein to designate the end of the housing or the end of the closure member toward which the fluid through the fluid conduit is flowing through the closure member and housing.

Further, the term "fluid actuated pressure" is used to designate the application of pressure to the closure member, which pressure may be either fluid pressure directly thereagainst or mechanical pressure, which is actuated by a fluid pressure, as for example, a piston which is actuated by a fluid under pressure thereagainst. Further, the term "hydraulic" is used to designate a liquid fluid, with oil being the preferred type of hydraulic fluid.

While the description herein will generally be in reference to a description of an embodiment of applicant's invention as it is applied to the return line of a well drilling rig, the invention is not so limited and has application in connection with the control fluid flow through other conduits.

Reference to the drawings will further explain the invention wherein like numerals refer to like parts, and in which:

FIG. 1 is a side view in central section showing one embodiment of applicant's invention in the open position.

FIG. 2 is a view similar to FIG. 1, but showing the apparatus with the closure member closed under low pressure.

FIG. 3 is a view similar to FIG. 2, but showing the closure member closed under high pressure.

FIG. 4 is a cross-sectional view taken generally at line 4—4 of FIG. 1.

FIG. 5 is a cross-sectional view taken generally at line 5—5 of FIG. 2.

FIG. 6 is a cross-sectional view taken generally at line 6—6 of FIG. 2 showing a portion of the closure member under low pressure closing conditions.

FIG. 7 is a partial cross-sectional view similar to FIG. 6 taken generally at line 7—7 of FIG. 3, showing the high pressure closing position of a portion of the closure member.

FIG. 8 is a side view in central section of another embodiment of the closure member of this invention.

FIG. 9 is a side view in central section showing still another embodiment of the invention herein, with the closure member shown in the open position.

FIG. 10 is a cross-sectional view generally at line 10—10 of FIG. 9, showing the closure member in the open position.

FIG. 11 is a partial cross-sectional view similar to FIG. 10, but showing the closure member thereof in the closed position.

FIG. 12 is a side view in central section of another embodiment of the invention, showing the closure member in the open position.

FIG. 13 is a partial cross-sectional view taken generally at line 13—13 of FIG. 12 with the closure member in the open position.

FIG. 14 is a partial cross-sectional view similar to FIG. 13 but showing the closure member in the closed position.

Referring now to FIG. 1, a housing is shown having inlet and outlet means communicating with a conduit, which housing is generally indicated by the numeral 11, and includes tubular sleeve 12 which has mounted on each end thereof an annular flange 13 which are held thereagainst by a plurality of bolts 14 circumferentially spaced thereabout and held in position by nuts 15.

Housing 11 is provided with inlet means and outlet means for connection to and communication with a fluid conduit such as a mud return line, in the form of inlet connector 17 and outer connector 18, each of which has a flange portion 19 which fits inside of and is held by the adjacent flange 13, and with fluid flow through the device being in the direction of arrow 20. It is to be understood that connectors 17 and 18 are adapted for connection to portions of the fluid conduit such that fluid flow is through housing 11 in the generally axial direction.

The inlet and outlet means of housing 11 may in certain embodiments include rigid sleeve means in the form of inlet sleeve 24, which fits inside of an internal recess provided in the bore on connector 17 and is sealed therewith by seal 25, and outlet sleeve 26, which is mounted in an internal recess in the bore of connector 18 and sealed therewith by seal 27.

Housing 11 is provided with an elastic body or closure member having a passageway therethrough in the form of an axial bore which communicates with sleeves 24 and 26, which closure member in one embodiment is in the form of a generally cylindrical body generally designated by the numeral 30 having a generally coaxially aligned bore therethrough communicating with sleeves 24 and 26.

The numeral 31 is used to designate a portion of the bore which is generally non-circular in cross-section and more particularly is in the form of an equilateral polygon, and even further specifically is in the form of a star having five points, as best seen in FIG. 4. For purpose of convenience, the lines forming the points of the star may sometimes be described as a "plurality of internal fold lines arranged to define a non-circular internal cross-section" through the body member. The bore through body 30 also has a larger cross-sectional area toward the outlet end thereof than in the non-circular area. This portion of the bore is generally designated by the numeral 32 and may be described as being tapered generally radially outwardly in the downstream direction, or stated another way, it is generally frusto conical in shape, with the base of the cone being toward the downstream end of body 30. The degree of this taper should be at least 2°.

It will be noted that sleeves 24 and 26 extend into the respective ends of the bore through body 30 as shown, and help support body 30 during deformation thereof under some circumstances.

In certain embodiments, body 30 is made of an elastomeric material, such as rubber, which material may be of a greater hardness toward the outlet end than toward the inlet end of body 30. As shown in FIGS. 1, 2, and 3, inlet end portion 35 is of a relatively soft elastomeric material, preferably less than 50 Shore durometer hardness and in the embodiment shown, 30 Shore durometer rubber. Outlet end portion 36 is of an elastomeric material generally greater than 50 Shore durometer in hardness, and in the embodiment shown, 70 Shore durometer rubber.

Inlet end of portion 35 has secured thereto, as by molding therewith, ring shaped plate 38 having O-ring seal 39 about the circumference thereof which seals with the inside surface of sleeve 12. The inside surface of plate 38 also slidingly engages the outside surface of sleeve 24.

Similarly, outlet end portion 36 has another ring shaped plate 40 bonded therewith as by molding, with the outside circumference thereof engaging the inside surface of sleeve 12 and the inside circumference thereof engaging the outside surface of sleeve 26.

The soft rubber of inlet end portion 35 meets with the harder rubber of oulet end portion 36 at interface 43, which interface is generally frusto conical in shape, with the large end of the cone being toward the outlet end. Interface 43 is generally located downstream from the major portion of non-circular area 31 of the bore. In addition, it may also be said that elastomeric material, i.e. rubber, increases in hardness from the outside surface of body 30 to the inside surface thereof at a cross-section through body member 30 in the area of interface 43. It will also be noted that the harder rubber surrounds tapered bore 32. This is an important feature of certain embodiments of the invention since the harder rubber of outlet end portion 36 has greater resistance to deformation, while the softer rubber of inlet end portion 35 can more readily be constricted or deformed radially inward to the closing position. In addition, tapered bore 32 is not only formed with harder rubber, but is itself frusto conical in shape as explained above and is therefore round in cross-section, thereby making it less susceptible to deformation radially inward and can, therefore, support a greater amount of pressure thereagainst.

Body 30 also has an annular outside surface portion adapted for the application of hydraulically actuated pressure thereagainst, which surface portion is in the form of annular recess 45 provided in the outside circumferential surface of body 30 and is radially spaced apart from at least a portion of polygonal area 31 of the bore through body 30.

Housing 11 includes means for applying fluid actuated pressure against body 30 and is shown in the form of input line 46 which communicates with recess 45 and is connected to any convenient source of pressurized fluid such as a pressurized hydraulic fluid, for example, pressurized oil.

Body 30, in the embodiment shown, is approximately 10 inches in axial length, 6¼ inches outside diameter at the largest part. The size of the star shaped area in cross-section is such that a circle circumscribing the outside points of the star would be about 2½ inches in diameter, in the open position, as shown in FIGS. 1 and 4.

As oil pressure is applied through input line 46, to annular recess 45, body 30 is initially deformed radially inwardly to the condition generally shown in FIGS. 2 and 5, assuming that initially there is no fluid pressure being applied through the conduit to which inlet connection 17 is attached. In so closing, the various sides making up the star generally collapse, with flat side to flat side, to the position shown in FIG. 5, with the result that closure is at a lower pressure and without constraining the rubber in the area of the bore to the extent that is normally done with a bore being circular in cross-section. Thus, closure of body member 30 may be effected with a very low pressure in excess of mud pressure in the mud return line, say on the order of 600 p.s.i., or perhaps even less, and can be maintained in the closed position once it has been closed by a pressure differential of only 200 to 300 p.s.i. over mud pressure at relatively low pressures, and perhaps only 100 p.s.i. differential at higher pressures. This particular embodiment is adapted to withstand pressures on the order of 5,000 p.s.i. and can withstand such pressures over extended periods of time without failing.

As shown in FIGS. 2 and 6, tapered bore 32 of body 30 is also deformed radially inwardly but to a less extent than non-circular area 31. This portion resists deformation because of the increased hardness of the rubber surrounding this area of the bore, because of its tapered shape, and because the fluid pressure applied to body 30 is somewhat axially spaced apart from this area of the bore. In addition, sleeve 26 helps to support the outlet end of the bore so that the bore maintains a larger cross-sectional area downstream, all of which combine to improve the Venturi effect of the discharge of mud through the device when it is only partially closed, with the improved wear characteristics concomitant therewith.

As oil pressure in annular recess 45 is increased above a minimum closing pressure, and with mud pressure being applied through inlet connection 17, body 30 is deformed further radially inward as shown in FIGS. 3 and 7.

This condition would occur when the body member was subjected to pressures on the order of 5,000 p.s.i. with the apparatus having the mud pressure applied thereto through connector 17. Nevertheless, tapered bore portion 32 still maintains its circular cross-section configuration with the improved Venturi effect.

Thus, there is provided an apparatus which can withstand high pressure for substantial periods of time without failure and in which the differential pressure above mud pressure required to effect closing is a minimum, such that body member 30 acts more like a diphragm whereby mud pressures can be more easily and carefully controlled.

The non-circular arrangement of a portion of the passageway through the closure member facilitates the ease with which that portion of the body member may be radially deformed to effect closing of partial closing thereof, as does the softer rubber. The circular arrangement of another portion of the passageway causes the body member to resist radially inward deformation in this area, as does the tapered shape, and the harder rubber, thereby maintaining the improved Venturi effect without cavitation and excessive wear at high pressures and velocities.

Applicant's device is less subject to mechanical binding or cocking which might otherwise require a higher pressure differential in order to effect closing or partial closing, as is the case with certain prior art devices. Because applicant's device closes with a minimum of pressure, there is also a minimum strain on the body 30 with the result that it is not subject to quick breakage and early failure.

Referring now to FIG 8, another embodiment of the invention will be described. This figure shows a closure member in the form of body 50, which is generally similar to body 30, except that it is made of rubber which is progressively harder from the inlet end, i.e., the left end as viewed in FIG. 8 to the outlet end, i.e., the right end as viewed in FIG. 8. For example, body 50 is comprised of a plurality of layers of rubber 51 varying in hardness from 90 Shore durometers to 20 Shore durometers for example, from inlet end to outlet end. Body 50 also has a passageway therethrough which has the same configuration as the passageway through body 30. Thus, the softer rubber is toward the inlet end to facilitate closing and the harder rubber is toward the outlet end to resist closing to provide the improved Venturi effect.

FIGS. 9 and 11 show another embodiment of the invention. In this embodiment, the housing is generally indicated by the numeral 53 and includes tubular sleeve 54, each end of which engages a ring shaped flange 55, which flanges are held together by means of a plurality of bolts 56 and nuts 57 circumferentially spaced thereabout in the same manner as the embodiment shown in FIG. 1. Housing 53 is also provided with inlet and outlet means in the form of inlet connection 58 having flange portion 59 (which is supported by a flange 55) and outlet connection 60 having externally enlarged flange portion 61, which is supported by the other flange 55. Hence, housing 53 is adapted for passage of fluid therethrough in the direction of arrow 62.

The inlet means of housing 53 also includes a rigid sleeve means in the form of inlet sleeve 64 which is mounted in sealing relationship with inlet connector 58. Outlet sleeve means in the form of outlet sleeve 65 is also provided and is mounted in sealing relationship with outlet connector 60. Sleeve 65 may be approximately 2¾ inches in outside diameter as compared with 2½ inches in outside diameter for sleeve 46, for example.

This embodiment also includes an elastomeric closure member mounted in housing 53 and having an axial bore therethrough communicating with the inlet and outlet means of housing 53, with at least a portion of the axial length of said bore being generally non-circular in cross-section (i.e., polygonal), which closure member is in the form of body 66, having inlet portion 67 of softer durometer material, as for example, 30 Shore durometer rubber and outlet end portion 68 of harder durometer material, as for example, 70 Shore durometer rubber, and having interface 69 therebetween. Interface 69 is generally frusto conical in shape, with the base of the cone being downstream. In this embodiment, the non-circular area of the bore through body 66 is in the shape of a six-sided equilateral polygon. However, an odd number of sides or foldlines is generally preferred, so that there is no common closing axis thereacross. When there is a common axis, there is a tendency for the closure member to prematurely collapse and to close flat, thereby destroying the preferred Venturi effect. As shown in FIG. 10, polygonal area 71 is in the form of an equilateral polygon having all inside angles greater than 90°. The bore of this embodiment is also provided with a frusto conical portion spaced downstream from portion 71 and is in the form of tapered portion 72. This portion of the bore is generally circular in cross-section thereby obtaining the desired benefits of increased resistance to deformation during the application of pressure to body 66 and is also in the area of the harder rubber forming body 66.

The inside circumference of the bore through body 66 toward the inlet end is provided with annular recess 75 which is positioned to face somewhat downstream, as shown, and is for the purpose of receiving thereinto any drilling fluid or any other fluid which may bleed past sleeve 64, and thereby provide additional sealing between body 66 and sleeve 64.

This embodiment also has means for selectively applying fluid actuated pressure to the downstream or outlet end of body 66, to thereby axially compress and radially inwardly form body 66 in polygonal area 71 of the bore, to thereby restrict fluid passage therethrough. The downstream end of body 66 is provided with an annular surface which is adapted for the application of hydraulically actuated fluid pressure thereagainst, in the form of annular end surface 78 having annular seal lip 79 extending around the inside circumference thereof and annular seal lip 80 extending around the outside circumference thereof. In addition, end surface 78 has bonded thereto as by molding, a rigid first ring member covering a substantial portion of said end surface in the form of ring 81 spaced between lips 79 and 80.

Flange 61 of outlet connector 60 also has connected thereto as by screws 77, a second ring member in the form of spacer ring 82 which is generally coaxially aligned with tubular sleeve 54 and is of smaller outside diameter than the inside diameter of sleeve 54, such that there is formed an annular space therebetween which is adapted to receive a pressurized fluid, such as pressurized oil through input line 83 passing through tubular sleeve 54, as shown. Hence, there is an oil space formed around ring 82 and between rings 81 and 82 which is indicated by the numeral 84. Upon application of oil pressure to space 84, body 66 is axially compressed and deformed radially inwardly in the area of polygonal area 71 of the bore therethrough. During this axial compression, body 56 is constrained by tubular sleeve 54, thereby causing polygonal portion 71 to close as shown in FIG. 11. During the closing operation each of the sides making up the polygonal area tends to initially bow outward and form a shape somewhat like a star, until final closing is effected as shown in FIG. 11. In this manner, the rubber or other elastomeric material making up the polygonal portion of the bore is subjected to less strain than is the case with closure members having circular bores in the closing area, as explained above. Hence, less pressure is required to effect closing of this embodiment of the invention than is required for prior art devices, although it may require somewhat more pressure than the embodiment shown in FIG. 1.

In this embodiment, body 66 is generally of the same outside dimensions as body 30, shown in FIG. 1, i.e. the embodiment shown is approximately 10 inches long, 6¼ inches in outside diameter, and polygonal area 71 of the bore has sides dimensioned such that a circle drawn therein and tangent with each of the six sides would have a diameter of about 2 inches.

This embodiment of the invention has advantages similar to the embodiment shown in FIG. 1. It closes with less oil pressure than is required for prior art devices. It is provided with soft rubber in the area where closing is initially effected and the bone through that portion of the body member is polygonal in shape, thereby effecting closing with less strain on the elastomeric material. In addition, the bore is provided with a frusto conical portion downstream from the polygonal area, which frusto conical portion is adjacent to the harder elastomeric material, thereby providing a closure member which may be subjected to greater pressure without failure. It will be noted in this embodiment that sleeves 65 extends into the outlet end of the bore through body 66 somewhat farther than sleeve 64 extends into the inlet end of the bore. This is important to compensate for the axial movement of outlet end portion 68 therewith during axial compression of body 66.

It is to be understood that body 66 could be made of a plurality of layers of rubber extending from the inlet end to the outlet end and each having increasing hardness the same as the embodiment shown in FIG. 8.

It is also to be understood that polygonal area 71 of body 66 could be star shaped in the same manner as polygonal area 31 of body 30 shown in FIG. 1. Conversely, polygonal portion 31 of FIG. 1 could be in the shape of an equilateral polygon wherein the inside angles are all greater than 90°, as is the case with polygonal area 71 of the FIG. 9 embodiment. However, the star shaped configuration is preferred for the FIG. 1 embodiment, wherein the fluid pressure is applied in the radial direction. A bore having a cross section in the form of a polygon with an odd number of sides is preferred for the embodiment shown in FIG. 9, since there will be no common axis thereacross which might encourage closing to a flat condition, as often occurs with closure members having circular bores only.

FIGS. 12, 13, and 14 show still another embodiment of the invention. It also is an apparatus for controlling fluid flow and has an elastic body defining a passageway for fluid flow and includes means for deforming the elastic body to selectively enlarge and restrict the passageway. Further, this embodiment also has a plurality of internal fold lines in at least a first portion of the body arranged to define a non-circular, internal cross section through the first portion to facilitate radial deformation of the body at the first portion. A second portion of the body is also arranged to resist radial deformaion.

In this embodiment there is provided a housing generally designated by the numeral 90, which is generally similar to housing 11 shown in FIG. 1 and includes a generally tubular sleeve 91, the ends of which have abutted thereagainst ring shaped flanges 92 which are held together by a plurality of circumferentially spaced about bolts 93, secured by nuts 94. Housing 11 also includes inlet means including inlet connector 97 having a flange portion 98 which fits inside of a flange 92. Housing 11 also has outlet means including outlet connector 100 having flange portion 101 abutting against a flange 92. Connectors 97 and 100 are adapted to be connected to the mud return line of an oil well being drilled, for example, such that fluid flow therethrough is in the direction of arrow 102.

Housing 11 also includes means for deforming the body or closure member, which means is conveniently shown in the form of an oil input line 103 which may be connected to any convenient source of pressurized fluid, such as pressurized oil, and communicates with the interior of sleeve 91.

The closure member or body of this invention is generally designated by the numeral 105 and includes a rubber closure element 107 which is generally annular in shape and is provided with a passageway therethrough communicating with the inlet and outlet means of housing 11.

At the upstream end, closure element 107 has bonded thereto an annular steel insert 109 which fits inside of sleeve 91 and abuts against flange portion 98 and is provided with appropriate seal means in the form of O-rings 111 and 112.

Closure element 107 has bonded thereto towards the downstream end another annular steel insert 114, which is preferably of somewhat greater axial length than insert 109. Insert 114 abuts against flange portion 101 and is sealed thereagainst by annular O-ring 115. Steel insert 114 also fits inside of sleeve 91 with the space therebetween being sealed by O-ring 116.

Closure element 107 is of an elastomeric material, such as rubber, and is provided with an annular recess thereabout forming annular oil chamber 118 inside of sleeve 91, which chamber communicates with oil input line 103. The passageway through closure element 107 is provided with a generally non-circular internal surface along an upstream portion thereof, generally indicated by the numeral 120 and a generally circular outwardly tapered downstream portion indicated by the numeral 121.

FIG. 13 generally shows the cross-sectional configuration of portion 120 in the open position and which configuration, for purposes of convenience, may sometimes be referred to as polygonal, or preferably as being star shaped, and is provided with axially extending fold lines which facilitate the ease of closure, much in the same manner as closure of the other embodiments of the invention. In other words, upon application of pressure oil to chamber 118, closure element 107 is deformed radially inwardly in the non-circular portion 120 such that it assumes a cross-sectional appearance as shown in FIG. 14. The further application of oil pressure to oil chamber 118 would, of course, result in ultimate closing of the passageway through element 107.

Circular portion 121 of the passageway through element 107 is adapted to have greater resistance to radial deformation than non-circular portion 120. A greater resistance to radial deformation occurs not only because of the tapered configuration of circular portion 121, but more importantly because of the rigidity provided by steel insert 114. Stated another way, that portion of closure member 105 which includes steel insert 114 will have greater resistance to radial deformation than that portion of closure member 105 in the area of non-circular portion 120. Result is that this embodiment of the invention has the desired feature of closing at a relatively low oil pressure in excess of mud line pressure, because of the novel configuration of the closure member, particularly in the area of non-circular portion 120. At the same time, the outlet end of the passageway through closure element 107 resists radial deformation and thereby maintains the desired Venturi effect, thereby eliminating excessive wear and providing a closure member which can withstand greater pressures and velocities than prior art devices.

The scalloped cross-sectional configuration of non-circular portion 120 is adapted to readily close much in the manner that star shaped portion 31 of the embodiment shown in FIG. 1 closes. It is to be understood that in this embodiment, the star shaped configuration or the hexagon or straight-sided configuration could be substituted for the scalloped configuration. While it will not be necessary, the rubber making up that portion of element 107 in the area of circular portion 121 may be of harder rubber than that rubber in the area of non-circular portion 120.

Further modifications may be made in the invention as particularly described without departing from the scope thereof. Accordingly, the foregoing description is to be construed as illustratively only and is not to be construed as limitation upon the invention as defined in the following claims.

What is claimed is:

1. In a fluid flow regulating apparatus, the combination comprising:
   a generally cylindrical housing having an inlet at one axial end and an outlet at the other axial end;
   a generally cylindrical closure member mounted in said housing, said closure member being of a generally solid unitary mass of elastomeric material and having an axial passageway therethrough communicating with said inlet and outlet of said housing, said closure member having the downstream portion thereof of a substantially harder material than the upstream portion thereof, with said harder material extending across substantially the full radial thickness of said downstream portion of said closure member, and said downstream portion of said closure member having that portion of said passageway passing therethrough formed with a circular and increasingly larger cross-sectional area in the downstream direction; and said upstream portion of said closure member having the major portion of said passageway therethrough in the shape of a polygon in cross-section in the relaxed condition;
   and means for selectively applying pressure to an external portion of said closure member to deform said upstream portion of said closure member substantially uniformly radially inward to a fluid flow controlling position.

2. The invention as claimed in claim 1 wherein:
   said major portion of said passageway through said upstream portion is hexagonal in cross-section.

3. The invention as claimed in claim 1 wherein:
   said major portion of said passageway through said upstream portion is star-shaped in cross-section.

4. The invention as claimed in claim 1 wherein:
   at least a portion of the interface between said harder material and the softer material in said closure member tapers radially outward and toward the downstream direction.

References Cited
UNITED STATES PATENTS

| | | | |
|---|---|---|---|
| 1,657,663 | 1/1928 | Devereux | 251—4 XR |
| 1,683,322 | 9/1928 | Annis | 251—8 |
| 2,467,150 | 4/1949 | Nordell | 251—5 XR |
| 2,518,625 | 8/1950 | Langstaff | 251—5 XR |
| 2,573,712 | 11/1951 | Kallam | 251—5 |
| 2,690,806 | 10/1954 | Britton | 251—5 XR |
| 2,795,390 | 6/1957 | Laurenty | 251—5 |
| 3,241,806 | 3/1966 | Snell | 251—362 XR |
| 3,378,226 | 4/1968 | Naundorf | 251—148 |

HAROLD W. WEAKLEY, Primary Examiner

U.S. Cl. X.R.

251—5, 148